United States Patent [19]

Kuwajima et al.

[11] Patent Number: 4,518,724
[45] Date of Patent: May 21, 1985

[54] AQUEOUS COATING COMPOSITION

[75] Inventors: Teruaki Kuwajima; Katsuaki Kida, both of Osaka; Shinichi Ishikura, Kyoto, all of Japan

[73] Assignee: Nippon Paint Co., Ltd., Osaka, Japan

[21] Appl. No.: 538,651

[22] Filed: Oct. 3, 1983

[30] Foreign Application Priority Data

| Oct. 4, 1982 | [JP] | Japan | 57-174890 |
| Dec. 8, 1982 | [JP] | Japan | 57-216200 |
| Jan. 25, 1983 | [JP] | Japan | 58-10875 |
| Jan. 25, 1983 | [JP] | Japan | 58-10876 |
| Jan. 29, 1983 | [JP] | Japan | 58-13205 |
| Jan. 29, 1983 | [JP] | Japan | 58-13206 |

[51] Int. Cl.³ ............ C09D 5/02; C09D 3/66; C09D 3/80; C09D 3/81
[52] U.S. Cl. .............. 523/501; 524/457; 524/458; 524/460; 524/461; 524/502; 524/515
[58] Field of Search ........ 523/501; 524/457, 458, 524/460, 501, 502, 515

[56] References Cited

U.S. PATENT DOCUMENTS

| 3,075,936 | 1/1963 | Bolton | 523/501 |
| 4,151,148 | 4/1979 | Chasin et al. | 523/501 |
| 4,174,332 | 11/1979 | Hönig et al. | 524/502 |
| 4,296,014 | 10/1981 | Hayashi et al. | 523/501 |
| 4,339,371 | 7/1982 | Robinson et al. | 524/460 |

FOREIGN PATENT DOCUMENTS 2102436  2/1983  United Kingdom ............ 523/501

OTHER PUBLICATIONS

Chemical Abstracts, vol. 83, No. 18, Nov. 3, 1975, p. 117, Abstract 83:149222v, 83:149223w.

Primary Examiner—Ronald W. Griffin
Attorney, Agent, or Firm—Wenderoth, Lind & Ponack

[57] ABSTRACT

An aqueous coating composition which comprises (A) at least one aqueous resin selected from acryl, alkyd, polyester, acryl-modified alkyd and acryl-modified polyester resins, (B) at least one component selected from water-insoluble resinous particles having an average grain diameter of 0.3 to 6μ, obtained by a polymerization of ethylenically unsaturated compound(s), and (C) optional additives, the weight ratio of said (A) to (B) (in solid) being 99:1 ~ 15:85. This aqueous paint is especially useful as a top-coat.

30 Claims, No Drawings

AQUEOUS COATING COMPOSITION

FIELD OF INVENTION

The present invention relates to an aqueous coating composition which is useful as top-coat paint and more specifically, to an aqueous type, top-coat paint based on an aqueous resinous composition containing as film-forming components, an aqueous resin and water insoluble resinous particles.

BACKGROUND OF THE INVENTION

Since a coating composition containing an organic solvent has many problems such as dangger of firing and explosion, being harmful to humans and creating a public hazard such as environmental pollution and the like, recently, its market share is decreasing and being replaced by aqueous and/or powder coating compositions. However, in a conventional aqueous coating composition, it is essential for the purpose of dissolving or dispersing the vehicle resin in water to introduce a number of hydrophilic groups in the molecule of said resin, use a quantity of neutralizing agent capable of forming water-soluble salt therewith, and to select such resin as having comparatively lower molecular weight, and therefore, the coating film performance in terms of durability, water resistance or the like is not so good. Secondly, since it is impossible to formulate an aqueous coating composition with a high non-volatile content, application characteristics are not, in general, satisfactory. Thirdly, dispersibility of coloring matter is not very good, so that the use is rather limited, especially in such technical fields as requiring a higher order of finishing appearance, gloss and sharpness, as in the automobile industry. An emulsion coating composition whose resin is prepared by the so-called emulsion polymerization in an aqueous medium, has indeed an advantage that a higher molecular resin can be utilized, but at the same time, has such problems that the preparation of said resin necessitates an emulsion polymerization technique of higher standard, and the surfactant or emulsifier added for emulsification will cause additional problems of decreased durability and water resistance of the film. On the other hand, a powder coating composition has its own problems. That is, if the glass transition temperature is too low, there occurs a blocking phenomenon, which will result in a coating with inferior performance, and the necessity of adopting a considerably higher baking temperature and using a special applicator will obstruct the general use of this coating composition.

A coating composition in which the powder coating is dispersed in water as a slurry has also been well known. This comprises as a main ingredient a powder coating. However, in this type of composition, there are problems such that (1) in general, it is difficult to increase the non-volatile content, and therefore, it is difficult to obtain a thicker coating and a satisfactory adhesion of the film to the substrate, and cracks may easily occur in the film, (2) it is difficult to have an appropriate viscosity and fluidity necessary for the coating by means of, for example, spraying, and thus, there is a problem of working therewith. The coating is also deficient in gloss.

(3) there is a tendency of sedimentation and separation of solid matter while storing the composition.

(4) Since a dispersing agent is generally used, there are problems in performance of the film such as water resistance and the like.

Among them, poor application characteristics are the most troublesome problem, and the slurry composition has not been practically used up to the present, on this account.

Recently, various attempts have been made to overcome the abovesaid drawbacks of the aqueous dispersion type coating composition. The most attractive one is to add to an aqueous slurry of powder coating a water soluble or water dispersible aqueous resin as a modifier. For example, in Japanese Patent Application Nos. 31636/76 and 25224/76, a water dilutable resin in a quantity of 0.5-30 wt% of resin particles is added, together with 0.05-30 wt% coloring matter, to a composition comprising 90 to 30 parts by weight of aqueous medium and 10 to 70 parts by weight of resin particles having a softening point of 5° to 120° C. and a mean diameter of 0.5 to 80 microns, to improve storage stability of the composition. Japanese Patent Application No. 127151/74 discloses a composition comprising 50 to 80% by weight of powdered resin and 20 to 50% by weight of water, compounded with 0.05 to 5 parts by weight of surfactant and 5 to 50 parts by weight of water soluble or dispersible resin per 100 parts by weight of said powdered resin. Also, in Japanese Patent Application Nos. 74606/79 and 170262/79, and Japanese Patent Publication No. 4149/80, mention is made of a water dispersion type coating composition comprising as main components, powder coating and water soluble resin, the content of said water soluble resin being about 10 to 20% of the powdered resin. In either case, water soluble or water dispersible resin is merely added to the water-powdered resin dispersion system as a modifier which will give the role of dispersion stabilizer. They, therefore, all belong to a category of slurry type coating based on powdered resin and hence, can never be free from the drawbacks possessed by themselves, in substance.

The inventors, as the results of extensive studies on water-borne coatings and especially an aqueous coating composition comprising aqueous resin (water soluble resin or water dilutable resin, hereinafter the same) dissolved or dispersed in water, have first found that it is necessary to use a particular type of aqueous resin which will fulfil certain requirements, one requirement is that water tolerance expressed in terms of water dilution (times) of the resin for a solution incapable of reading out the defined type must be more than 4 in a test wherein 5 g of aqueous varnish of the resin having a normal viscosity usually employed in the manufacture of coating composition are correctly weighed in 100 ml beaker, increasing amounts of deionized water are added thereto, and No. 1 type (26 point type) is read through the beaker. The second requirement is that the surface tension of a 1 wt% aqueous solution is less than 51 dyne/cm. If these requirements are satisfied, then even if the weight ratio of aqueous resin to water insoluble resinous particles (on solid basis) be selected in a wide range of 98:2 to 45:55, there is no undesirable increase in viscosity irrespective of the increased solid content, which is attributable to the improvement of working property of the composition and, furthermore the thus obtained mixture is very stable for a long period of time because of its specific rheological properties, and can result in a film with excellent performance. On the basis of these findings, the inventors have filed a patent application (Japanese Patent Application No. 114686/81).

The abovementioned aqueous coating composition was indeed very successful in improving application characteristic, storage stability, durability, and water resistance of water-borne paint, but was merely developed as surface treatment and primer, like many previous proposals. As a top-coat requiring a highly glossy and flat coating, this composition cannot be said to be fully satisfactory in its desired film performance.

Under the circumstances, it has strongly been desired to have an aqueous type, top-coat paint composition capable of forming a coating with a higher gloss and flatness required for a top-coat, while maintaining the desired properties of aqueous resin in respect of pigment dispersibility and gloss and improving application characteristics (popping and sagging) and storage stability thereof.

The inventors, in a series of studies for attaining the improvement in application characteristics of an aqueous paint composition by adding water insoluble resinous particles, thereby increasing the resin content, have continued studies on the correlation between the film properties and such factors as combination of resins used, properties of water insoluble resinous particles, compounding ratio of aqueous resin to water insoluble resinous particles, and solid content in the resinous composition. The inventors have now found that in a combination of a certain type of aqueous resin and water insoluble resinous particles, when the resinous particles are selected from those whose mean diameter is in a specific range, an aqueous type paint composition which is excellent in application characteristics and storage stability and is useful as a top-coat capable of producing a coating with higher gloss and flat surface can be obtained. Particular preference is given to the composition wherein the solid ratio of aqueous resin and water insoluble resinous particles is in a specific range. On the basis of these findings, the present invention has been completed.

SUMMARY OF THE INVENTION

The gist of the invention resides in an aqueous coating composition comprising a resinous vehicle composed of (A) at least one aqueous resin selected from the group consisting of polyester resins, alkyd resins, acrylic resins, acryl-modified polyester resins and acryl-modified alkyd resins, and (B) at least one component selected from water insoluble resinous particles obtained by polymerization or copolymerization of $\alpha,\beta$-ethylenically unsaturated monomers, the mean diameter of said water insoluble resinous particles being $0.3 \sim 6\mu$ and the weight ratio of said resin (A) to resin (B) being, on solid basis, $99:1 \sim 15:85$.

DESCRIPTION OF THE PREFERRED EMBODIMENTS

An aqueous resin (water soluble resin or water dilutable resin, hereinafter the same) used in the present invention is any member of polyester, alkyd, acryl, acryl-modified polyester or acryl-modified alkyd resins customarily used in the paint field.

The polyester resin is a common member obtained by the polycondensation of polycarboxylic acid and polyhydric alcohol. Examples of said polycarboxylic acid are linear chain dicarboxylic acids such as oxalic acid, succinic acid, succinic anhydride, adipic acid, azelaic acid and sebacic acid; aromatic fatty acids such as phthalic acid, phthalic anhydride, isophthalic acid, terephthalic acid, tetrahydrophthalic anhydride, hexahydrophthalic acid, hexahydrophthalic anhydride, tetrabromophthalic anhydride, trimellitic acid, trimellitic anhydride, pyromellitic acid and pyromellitic anhydride; and unsaturated dicarboxylic acids such as maleic acid, maleic anhydride, fumaric acid and itaconic acid; and examples of said polyhydric alcohol are glycols such as ethyleneglycol, propyleneglycol, 1,3-butylenediol, 1,6-hexanediol, diethyleneglycol, neopentyl glycol, and triethylene glycol; hydrogenated bisphenol A, bis phenol dihydroxypropyl ether, glycerol, trimethylol ethane, trimethylol propane, pentaerythritol and the like. However, they should not be taken in a limitative sense and any materials customarily used for the preparation of common polyester resins may be satisfactorily used in the present invention. It is also possible to add, for the purpose of molecular weight control, monocarboxylic acid or monohydric alcohol in the reaction system.

Alkyd resins may be obtained by subjecting said polyester to an esterification with drying oil or its fatty acid. Suitable drying oil and fatty acid which may be used include linseed oil, tung oil, oiticica oil, dehydrated castor oil, coconut oil, dehydrated coconut oil, rice bran oil fatty acid, tall oil fatty acid, soybean oil, octyl acid and the like. The alkyd resins may be of epoxy-, rosin- or phenol resin-modified type. No detailed explanation for the preparation of these resins shall be required because they are well known.

In the present invention, acrylic resins may also be satisfactorily used. Such acrylic resins may be obtained by effecting polymerization of either one or any combination of the following monomers having, in the molecule, at least one, polymerizable ethylenic unsaturation bonding:

(1) carboxyl bearing monomer: acrylic acid, methacrylic acid, crotonic acid, itaconic acid, maleic acid, fumaric acid, and the like.

(2) hydroxyl bearing monomer: 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like.

(3) nitrogen containing alkyl acrylate or methacrylate: dimethylaminoethyl acrylate, dimethylaminoethyl methacrylate and the like.

(4) polymerizable amide: acrylic amide, methacrylic amide and the like.

(5) polymerizable nitrile: acrylonitrile, methacrylonitrile and the like.

(6) alkyl acrylate or alkyl methacrylate: methyl acrylate, methyl methacrylate, ethyl acrylate, ethyl methacrylate, n-butyl acrylate, n-butyl methacrylate, 2-ethylhexyl acrylate and the like.

(7) polymerizable aromatic compound: styrene, $\alpha$-methyl styrene, vinyl toluene, t-butyl styrene and the like.

(8) $\alpha$-olefin: ethylene, propylene and the like.

(9) vinyl compound: vinyl acetate, vinyl propionate and the like.

(10) diene compound: butadiene, isoprene and the like.

Such $\alpha,\beta$-ethylenically unsaturated monomers are, in the presence of light, heat, organic peroxide or inorganic peroxide, or radical initiator such as azo compound, polymerized by any conventional polymerization means.

Another class of aqueous resins advantageously used in the present invention are acryl-modified polyester and acryl-modified alkyd resins, i.e. polyester and alkyd resins in which acryl polymer segments are included. Such acrylic modified resins may be obtained by any of the following methods:

(1) Preparation of acrylic resin in the presence of polyester or alkyd resins having unsaturation bonding:

In preparing a polyester by the polycondensation of polycarboxylic acid and polyhydric alcohol, unsaturated polyester may be obtained by using as a part of said polycarboxylic acid component an unsaturated acid such as, for example, maleic acid, maleic anhydride, fumaric acid, citraconic acid, itaconic acid, dimer acid or the like. Unsaturation bonding bearing alkyd resin may be prepared by reacting thus obtained unsaturated polyester with drying oil or fatty acid.

Acrylic monomers are then polymerized in the presence of such polyester or alkyd resin having unsaturation bonding, using as polymerization initiator a common free-radical catalyst such as, for example, azobis-isobutyronitrile, benzoyl peroxide, di-t-butyl peroxide, cumene hydroperoxide and the like, or a chain transfer agent such as ethyl mercaptan, butyl mercaptan, dodecyl mercaptan, carbon tetrabromide, carbon tetrachloride and the like, to obtain the acryl-modified polyester or acryl-modified alkyd resin to be used in the present invention.

As the acrylic monomers, any of the abovementioned compounds having, in the molecule, at least one polymerizable, ethylenic unsaturation bonding customarily used in the preparation of acrylic resins may be satisfactorily used.

(2) Polymerization of acrylic monomers, at least part of which is an oxirane bearing ethylenically unsaturated monomer, in the presence of carboxyl bearing polyester or alkyd resin:

Polyester or alkyd resin usually contains carboxyl groups originated from the polycarboxylic acids. Therefore, when the abovesaid acrylic monomers, at least part of which is an oxirane bearing, ethylenically unsaturated monomer such as glycidyl acrylate, glycidyl methacrylate or the like, are polymerized in the presence of such carboxyl bearing polyester or alkyd resin, there is provided an acryl-modified polyester or alkyd resin.

(3) Polymerization of acrylic monomers, a part of which is carboxyl bearing monomer, in the presence of oxirane bearing polyester or alkyd resin:

From a polycarboxylic acid component and a polyhydric alcohol component having 2 or more oxirane groups, an oxirane bearing polyester or alkyd resin is first prepared. Thereafter, the abovesaid acrylic monomers, including carboxyl bearing $\alpha,\beta$-ethylenically unsaturated monomer such as, for example, acrylic acid, methacrylic acid, crotonic acid, itaconic acid, maleic acid or fumaric acid are reacted in the presence of said resin to obtain an acryl-modified polyester or alkyd resin to be used in the present invention.

(4) Reaction of carboxyl bearing polyester or alkyd resin (or acryl resin) and oxirane bearing acryl resin (or polyester or alkyd resin):

Carboxyl group is present on either of polyester or alkyd resin and acryl resin, the and oxirane group is present on the other resin. By the reaction of these two resins, the desired acryl-modified polyester or alkyd resin may be obtained.

(5) Polymerization of acrylic monomers in the presence of mercapto group bearing polyester or alkyd resins:

Polyester or alkyd resin is first prepared by using mercapto a group bearing polycarboxylic acid or polyhydric alcohol. The abovesaid acrylic monomers are then polymerized, using said polyester or alkyd resin as a chain transfer agent.

The above are typical methods for the preparation of the present acryl-modified polyester or alkyd resin. However, the invention is not limited to them, and any method may satisfactorily be used providing it yields an acryl-modified polyester or alkyd resin in which acrylic polymer segment(s) is (are) included in the polyester or alkyd resin.

Solubilization of such resin may be done by following conventional methods. For example, water solubility or water dilutability may be given to the resin by effecting neutralization of acidic group such as carboxyl with a basic material, (e.g. monomethylamine, dimethylamine, trimethylamine, monoethylamine, triethylamine, monoisopropylamine, diisopropylamine, diethylene triamine, triethylenetetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide and the like.

One or more of the abovementioned aqueous resins may be adequately selected in the invention. They may be of thermoplastic or thermosetting type. Thus, they may or may not carry functional groups which are mutually reactive with those of other aqueous resin and/or water insoluble resin, when heated. Examples of such functional groups, are carboxylic group, sulfonic group, phosphoric group, hydroxyl group, oxirane group, active methylol group, amino group, reactive carbon-carbon unsaturation bonding, isocyanate group, blocked isocyanate group, halogen and the like. These groups may be incorporated into the resinous molecule by general methods such as selection of appropriate monomer in the preparation of said resin, control of polymerization reaction and the like, if desired.

In the present invention, besides the abovesaid aqueous resin(s), water insoluble resinous particles are used. The water insoluble resinous particles are composed of acrylic or vinyl polymers and copolymers obtained by the polymerization of ethylenically unsaturated compounds. In preparing such polymers or copolymers, use can be made of any compounds having one or more polymerizable ethylenic unsaturation bondings as already stated in connection with the preparation of the aqueous acrylic resin.

These polymers may be of crosslinked type. At this time, polymerization may be carried out with ethylenically unsaturated monomers, at least 2 of said monomers each having mutually reactive groups such as, for example, epoxy and carboxyl, amine and carboxyl, epoxy and carboxylic acid anhydride, amine and acid chloride, alkyleneimine and carbonyl, organoalkoxysilane and carboxyl, hydroxyl and isocyanate and the like. Alternatively, use can be made of a compound having in its molecule 2 or more ethylenic unsaturation bondings capable of radical polymerization (hereinafter called crosslikable monomer). Examples of such crosslinkable monomer are polymerizable, unsaturated monocarboxylic acid ester of polyhydric alcohol, polymerizable unsaturated alcohol ester of polycarboxylic acid, and aromatic compound substituted with 2 or more vinyl groups, including ethyleneglycol acrylate, ethyleneglycol methacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxydimethacrylate, 1,1,1-trishydroxymethylethane triacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimeritate, diallyl aterephthalate, diallyl phthalate, divinyl benzene and the like.

The fine particles of acrylic or vinyl polymer or copolymer used in the invention should have a mean grain diameter of 0.3 to 6$\mu$, and preferably 0.4 to 5$\mu$. Any of the known methods may be freely selected for the preparation of such polymer particles, provided that the mean grain diameter is in the abovesaid range. Thus, the polymer particles may be prepared by polymerizing monomers appropriately selected from the above said monomeric compounds by solution polymerization, suspension polymerization or the like, and then subjecting to mechanical crushing to the desired mean diameter. However, preference is given to emulsion polymerization wherein the monomers are polymerized in the presence of polymerization initiator, in an aqueous medium containing a surfactant, emulsifier or the like.

The most preferable one may be the so-called seed emulsion method or the method wherein a water soluble oligomer is first prepared and an emulsion polymerization is then carried out, utilizing the thus formed oligomer as polymerization nucleus. Since the emulsion polymerization technique per se has been well known, there is no necessity of making further explanation on it.

In practicing the emulsion polymerization, any of the known surfactants or emulsifiers may be satisfactorily used. In place of or in addition to the said surfactant or emulsifier, use can be made of amphoteric ion resin as described in, for example, Japanese Patent Application Nos. 110865/79; 56048/80; 116293/80; 123899/78; 47652/80; 71864/81 and 13053/82. Examples of the polymerization initiator are organic peroxides such as benzoyl peroxide, t-butyl peroxide, cumene hydroperoxide and the like; organic azo compounds such as azobiscyanovaleric acid, azobisisobutyronitrile, azobis(2,4-dimethyl)valeronitrile, azobis(2-amidinopropane)hydrochloride and the like; inorganic water soluble radical initiators such as potassium persulfate, ammonium persulfate, sodium persulfate, hydrogen peroxide and the like; redox initiators and the like.

As the chain transfer agent, use can be made of mercaptans such as ethyl mercaptan, butyl mercaptan, dodecyl mercaptan and the like, and carbon halogenides such as carbon tetrabromide, carbon tetrachloride and the like. The weight ratio of these ancillary materials and reaction medium, i.e. surfactant, emulsifier, polymerization initiator, chain transfer agent and water, and polymerization procedures are all of public knowledge. In an emulsion polymerization, an aqueous medium is customarily used to obtain an emulsion in which water insoluble resinous particles are uniformly dispersed. In the present invention, thus formed emulsion may be directly compounded with the aqueous resin.

Alternatively, the emulsion may be concentrated before adding the aqueous resin or the resinous particles may be isolated from the emulsion and then added to the aqueous resin. Therefore, the reaction medium is not limited to water alone, and it is possible to use the so-called NAD method with non-aqueous solvent to obtain the water insoluble resinous particles of the present invention.

As already stated, the present water insoluble resinous particles should have a mean grain diameter of 0.3 to 6$\mu$. This is because, if the mean grain diameter is outside the abovesaid range, there is a tendency that the coating will become deficient in gloss and flatness and cannot fully meet the requirements of a top-coat.

As to the molecular weight (number average molecular weight) of said resinous particles, there is no particular limit and it may be of the same order as those of the resins customarily used in the paint field. However, at the level of less than 2,000, there is a tendency that the stability of resinous particles in the system is lost. Therefore, particular preference is given to a range of 2,500 to 50,000.

Though it is not essential in the present invention, the solubility parameter ($\delta$ sp) of the high molecular compound constituting the present water insoluble resinous particles should preferably be less than 10.8, and especially less than 10.4, to obtain the product having markedly improved application characteristics and coating appearance. Incidentally, said solubility parameter ($\delta$ sp) can be determined according to the formula of K. W. Suh, J. M. Corbett; Journal of Applied Polymer Science, 12, 2359 ('68):

$$\delta sp = (Vml.\delta ml + Vmh.\delta mh)/(Vml + Vmh)$$

wherein ml: low Sp solvent, mh: high Sp solvent, $\delta$: solubility parameter, V: molecular volume at turbid point.

The inventors, having further continued and widened studies on the grain structure and especially the surface structure of the resinous particles, have now found that far better results in respect of gloss and/or application characteristics can be obtained with water insoluble resinous particles of double structure, i.e. inner and outer layers, each having different properties. That is, according to the studies it was found that with the particles having a relatively highly hydrophilic outer layer and a lesser hydrophilic inner layer, it is possible to obtain a paint composition which is excellent particularly in gloss, as well as stability and application characteristics. This is because the characteristics of hydrophilic groups on the grain surface are fully exhibited while maintaining the total quantity of hydrophilic groups in the whole grain at a controlled level. With particles having a relatively hard inner portion with higher glass transition temperature and a relatively soft outer portion with lower glass transition temperature, or having a relatively hard inner portion of higher molecular weight and relatively soft outer portion of lower molecular weight, it is possible to obtain a paint composition, which is specifically excellent in application characteristics, besides other desirable properties as a top-coat, because of relative softness of the grain surface and improved flowability. With particles having a relatively soft inner portion with lower glass transition temperature and a hard outer portion with higher glass transition temperature, or a relatively soft inner portion with lower molecular weight and a relatively hard outer portion with higher molecular weight, it is possible to obtain a top-coat paint composition which is excellent in gloss, because the surface portion of the particles is relatively hard and the whole particle is reasonably soft. Preparation of such resinous particles as having double structure of inner and outer portions each having different properties is rather easy by the adoption of a two stage polymerization technique and especially two stage emulsion polymerization technique. That is, water insoluble resinous particles, each particle being composed of double structure of inner and outer portions having different properties, may be easily prepared by changing in each stage the kind and amounts of monomers to be polymerized, controlling the amount of chain transfer agent and adopting crosslinking and the like. More specifically, in the double structured particles having an outer layer of highly hydrophilic nature, hydrophilic group bearing monomer is present in the first stage of emulsion polymerization in an amount corresponding to 0 to 50% by weight of the total monomers to be polymerized, and in the second stage in an amount corresponding to 0.5 to 100% by weight of the total monomers to be polymerized. In changing the number average molecular weight of the high molecular compounds constituting the inner and outer layers of the resinous particles, in one stage of said emulsion polymerization, chain transfer agent is used in an amount corresponding to 0.3 to 7% by weight of the total monomers (calculated as dodecylmercaptan) and in the other stage, an amount corresponding to 0 or less than 0.3~7% by is used. Tg values of inner and outer portions may be varied by changing monomers and their weight ratio used in the respective stage of emulsion polymerization.

Usually, the weight ratio of inner polymer to outer polymer is selected in the range 97~40 wt%:3~60 wt%. However, this is not absolutely essential, and may be appropriately changed.

The present water insoluble resinous particles may be composed of one or more of the abovesaid polymers or copolymers. They may carry functional groups capable of reacting with each other when heated or with the functional groups possessed by the aqueous resins. Thus, the present composition comprising aqueous resin and resinous particles may be thermoplastic or thermosetting as a whole.

In the coating composition of this invention, it is essential that said aqueous resin and water insoluble resinous particles are combined together in the ratio (on solid basis) of 99~15% by weight of the former to 1~85% by weight of the latter. This is because, if less of the aqueous resin is used, there is a tendency that dispersion stability of the resinous particles be decreased and the coating flatness be lost, and if the amount of water insoluble resinous particles is less than 1% by weight, it is unable to attain the objects of the invention as a top-coat. Preferably, the solid weight ratio of aqueous resin to water insoluble resinous particles is 99:1 to 40:60. As the reaction medium, water is generally used. However, hydrophilic, polar organic solvents may coexist, if desired. Examples of such organic solvent are ethyleneglycol monomethyl ether, ethyleneglycol monoethylether, ethyleneglycol monobutylether, methanol, ethanol, isopropanol, n-butanol, sec-butanol, t-butanol, dimethylformamide and the like.

The proportion of water medium to resinous component is rather variable for the following reason. Usually, solid content of 10 to 80% is suitable for spray coating, 5 to 90% for brush coating, and 1 to 60% for dipping application. However, the present coating composition is characterized by having an excellent dispersion stability of the resinous particles and hence, the composition can be maintained for a longer period of time, with relatively higher solid content, and diluted to the desired solid content just before the use thereof.

In the present invention, the coating composition comprises as essential components, said aqueous resin, water insoluble resinous particles and aqueous medium, and it is useful as a clear paint as it is, to obtain a coating with excellent gloss and flatness. Furthermore, to this resinous composition, pigment, crosslinking agent and other additives may be added according to general paint manufacturing technique, and mixed well to obtain an aqueous coating composition for a colored top-coat having improved application characteristics, durability and capable of forming a coating with excellent gloss and flat surface. At this time, any coloring matters usually employed for top-coat paint may be satisfactorily used. For compounding the coloring matter, it is preferred to make a colored paste using a part of the aqueous resin and the coloring matter and to add to the colored paste the remaining amount of aqueous resin, resinous particles and other additives and subject the mixture to a mixing and dispersing procedure using a known dispersing means as gate mixer, high speed disperser and the like. However, it is of course possible to add from the first all of the abovesaid components to a dispersing device and make a dispersion therewith.

Crosslinking agent may also be included in the present coating composition, if desired. Examples of such materials are aminoplasts like melamine-formaldehyde resin, methoxy modified or butoxy modified melamine-formaldehyde resin, urea resin, thiourea resin, guanamine resin, acetoguanamine resin and the like; isocyanate compounds such as isocyanate, polyisocyanate, blocked polyisocyanate and the like; and phenol resins. If desired, other conventional additives such as antisagging agent, antisetting agent, antiflooding agent, antifish-eye agent, surface tension regulator, antioxidant, light stabilizer, UV absorber and the like may also be added.

The inventors also have found that application characteristics of the coating composition and flatness of the coating may markedly be improved by the addition of oily or solid suface regulator, and especially a compound which is solid at room temperature but can be melted at a baking temperature (e.g. about 80°~180° C.) like benzoin, hydrogenated bisphenol A, petroleum resin, phenol resin, rosin resin, ketone resin, alicyclic hydrocarbons and the like. Therefore, addition of such regulator is specifically preferred, though it is not essential in the present composition. The compounding ratio of the coloring matter, cross-linking agent and other additives, and procedures, are conventional and one may follow any conventional techniques known in the related technical field. The present coating composition may be directly or after dilution with water, applied by usual application means as spraying, dipping and brushing and dried or subjected to baking to obtain a top-coat with improved gloss, flatness and durability. Also, the coating composition can exhibit storage stability and application characteristics and hence is very useful as an aqueous coating composition for a top-coat.

The invention shall be now more fully explained in the following Examples. Unless otherwise stated, all parts are by weight.

MANUFACTURING EXAMPLE 1

Preparation of resinous particles (1)

Into a 2 liter glass vessel fitted with stirrer, thermoregulator, and condenser, were placed 1100 parts of deionized water and heated to 80° C. To this, were added an aqueous solution of 100 parts deionized water and 6 parts ammonium persulfate, and 5 parts of a monomer mixture consisting of 210 parts methylmethacrylate, 75 parts 2-ethylhexylacrylate and 15 parts n-dodecylmercaptan and the mixture was stirred for 5 minutes. Thereafter, 259 parts of the same monomer mixture were dropwise added to the reaction mixture over 1 hour. After completion of said addition, stirring was continued for 15 minutes and then an aqueous solution consisting of 10 parts of deionized water and 1 part of ammonium persulfate was added and the mixture was stirred for 1 hour to obtain a seed emulsion having a solid content of 20%.

Into a similar reaction vessel as used in the preparation of seed emulsion, were placed 300 parts of deionized water and 25 parts of said seed emulsion, and the mixture was heated to 80° C. To the reaction vessel, was added, while stirring, an aqueous solution consisting of 20 parts of deionized water and 0.1 part of ammonium persulfate, and then dropwise a pre-emulsion consisting of 360 parts of methylmethacrylate, 105 parts of 2-ethylhexylacrylate, 35 parts of 2-hyddroxyethylacrylate, 5 parts of n-dodecylmercaptan, 200 parts of deionized water, 0.4 part of sodium dodecylbenzene sulfonate and 0.8 part of ammonium persulfate over 2 hours. Thereafter, stirring was continued for 30 minutes, an aqueous solution of 0.2 part of ammonium persulfate and 20 parts of deionized water was added and stirring was further continued for 1 hour.

Thus obtained emulsion had a solid content of 48.5%. average grain diameter of the resinous particles (measured by electronmicroscope) being 0.7μ, maximum diameter being 1.4μ and number average molecular weight being 9,800.

MANUFACTURING EXAMPLE 2

Preparation of resinous particles No. 2

In a similar reaction vessel as used in Manufacturing Example 1, was weighed 600 parts of deionized water and the temperature was raised to 80° C. To this, were added an aqueous solution of 30 parts of deionized water and 8 parts of ammonium persulfate, and 30 parts of a monomer mixture of 432 parts of methyl methacrylate, 126 parts of 2-ethylhexylacrylate, 42 parts of 2-hydroxyethyl acrylate and 30 parts of t-dedecyl mercaptan, and the mixture was stirred for 5 minutes. Next, the remaining 600 parts of said monomer mixture were dropwise added over 3.5 hours and stirring was continued for 30 minutes. At this stage, an aqueous solution of 24 parts of deionized water and 0.24 part of ammonium persulfate was added and the reaction mixture was stirred for additional 1 hour.

Thus obtained emulsion had a non-volatile content of 49.0%, average grain diameter of the resinous particles being 0.9μ, the maximum diameter being 0.95μ and number average molecular weight of the resin being 4,200.

MANUFACTURING EXAMPLE 3

Preparation of resinous particles No. 3

Into a 2 liter glass reaction vessel fitted with stirrer, thermoregulator and condenser, were weighed 1100 parts of deionized water and the temperature was raised to 80° C. To this, an aqueous solution of 100 parts of deionized water and 6 parts of ammonium persulfate, and a monomer mixture of 5 parts of styrene and 0.25 part of n-dodecyl mercaptan were added and the mixture was stirred for 5 minutes. Thereafter, 295 parts of styrene were added dropwise over 1 hour, the mixture was stirred for 15 minutes and then was added an aqueous solution of 10 parts of deionized water and 1 part of ammonium persulfate and the mixture was further stirred for 1 hour to obtain a seed emulsion having a non-volatile content of 20%.

In a 2 liter reaction vessel, were placed 480 parts of deionized water and 2.5 parts of said seed emulsion, and while continuing stirring, there was added a pre-emulsion of 1 part of chlorobenzene, 5 parts of deionized water and 0.0008 part of sodium dodecylbenzene sulfonate, and stirring was continued for 10 hours. Thereafter, a solution of 400 parts of styrene and 4 parts of azobisisobutyronitrile was dropwise added at 80° C. over 5 hours and the mixture was stirred for 1 hour. Thus obtained emulsion had a non-volatile content of 48%, average grain diameter of the resinous particles being 4.5μ and the maximum diameter 5μ, and number average molecular weight of the resin being 52,000.

MANUFACTURING EXAMPLES 4 TO 8

Preparation of resinous particles Nos. 4 to 8

Following the procedures as stated in Manufacturing Example 1 but using the following pre-emulsions shown in Table 1, resinous particles Nos. 4 to 8 were prepared, respectively.

MANUFACTURING EXAMPLES 9 TO 12

Preparation of resinous particles Nos. 9 to 12

Following the procedures as stated in Manufacturing Example 1 but using the pre-emulsions shown in Table 2, the resinous particles Nos. 9 to 12 were prepared, respectively.

TABLE 1

| resin. partic. | composition of pre-emulsion ||||||||||||||
| | MMA | 2-EHA | 2-HEA | ST | MAA | EGDM | DM | DBS | ASP | DIW | NV % | D μ | Dmax μ | Mn |
| --- | --- | --- | --- | --- | --- | --- | --- | --- | --- | --- | --- | --- | --- | --- |
| 4 | 360 | 105 | 35 | — | — | — | 25 | 0.4 | 0.8 | 200 | 48 | 0.7 | 1.4 | 4000 |
| 5 | 260 | 105 | 35 | 100 | — | — | 10 | 0.4 | 0.8 | 200 | 48 | 0.5 | 0.9 | 7600 |
| 6 | 340 | 95 | 35 | — | 30 | — | — | 0.4 | 0.8 | 200 | 48 | 1.8 | 3.2 | 20000 |
| 7 | 255 | 105 | 35 | 100 | — | 5 | — | 0.4 | 0.8 | 200 | 48 | 1.2 | 3.0 | — |

TABLE 1-continued

| resin. partic. | composition of pre-emulsion | | | | | | | | | | | | | |
|---|---|---|---|---|---|---|---|---|---|---|---|---|---|---|
| | MMA | 2-EHA | 2-HEA | ST | MAA | EGDM | DM | DBS | ASP | DIW | NV % | D μ | Dmax μ | Mn |
| 8 | 250 | 250 | — | — | — | — | 5 | 0.4 | 0.8 | 200 | 48 | 1.3 | 2.6 | 10000 | wherein:
MMA: methyl methacrylate
2-EHA: 2-ethylhexyl acrylate
2-HEA: 2-hydroxyethyl acrylate
ST: styrene
MAA: methacrylic acid
EGDM: ethyleneglycol dimethacrylate
DM: n-dodecyl mercaptan
DBS: sodium dodecylbenzene sulfonate
APS: ammonium persulfate
DIW: deionized water
NV: non-volatile content of emulsion
D: average grain diameter of resinous particles
Dmax: maximum diameter of resinous particles

TABLE 2

| resin. partic. | composition of pre-emulsion | | | | | | | | | | | | | | |
|---|---|---|---|---|---|---|---|---|---|---|---|---|---|---|---|
| | MMA | i-BMA | 2-EHA | 2EHMA | EGDM | 2HEA | DM | DBS | ASP | DIW | NV % | D μ | Mn | δ sp |
| 9 | — | 369 | — | 96 | — | 35 | 25 | 0.4 | 0.8 | 200 | 48 | 0.8 | 3800 | 9.5 |
| 10 | 234 | — | 15 | 216 | — | 35 | 25 | 0.4 | 0.8 | 200 | 48 | 1.5 | 4700 | 10.0 |
| 11 | — | 465 | — | — | — | 35 | 15 | 0.4 | 0.8 | 200 | 48 | 0.8 | 7500 | 9.6 |
| 12 | — | — | 460 | — | 5 | 35 | 5 | 0.4 | 0.8 | 200 | 48 | 1.0 | 11000 | 8.8 | wherein:
i-BMA: i-butyl methacrylate
2-EHMA: 2-ethylhexyl methacrylate

RESINOUS PARTICLES COMPOSED OF INNER AND OUTER PORTIONS EACH HAVING DIFFERENT Tg

MANUFACTURING EXAMPLE 13

Preparation of resinous particles No. 13

Into a 2 liter glass reaction vessel fitted with stirrer, thermoregulator and condenser, were placed 250 parts of deionized water and 25 parts of seed emulsion as stated in Manufacturing Example 1 and the temperature was raised to 80° C. To this, was added, while stirring, an aqueous solution of 10 parts of deionized water and 0.1 part of ammonium persulfate, and then dropwise a pre-emulsion consisting of 400 parts of methyl methacrylate, 29 parts of 2-hydroxyethyl acrylate, 200 parts of deionized water, 0.4 part of sodium dodecylbenzene sulfonate and 0.9 part of ammonium persulfate over 2 hours. The calculated Tg of random polymer composed of said monomer composition is 93.5° C. After 1.5 hours from the commencement of said addition of pre-emulsion, simultaneous addition of another monomer mixture of 60 parts of 2-ethylhexyl acrylate and 6 parts of 2-hydroxyethylacrylate was started and continued for 30 minutes. The calculated Tg of random polymer from said monomers is −80° C. After completion of said addition, stirring was continued for 30 minutes, and to the reaction mixture was added an aqueous solution of 0.2 part of ammonium persulfate and 20 parts of deionized water and stirred for additional 1 hour to complete the reaction. Thus obtained emulsion had a non-volatile content of 50.0%, average grain diameter of the resinous particles being 1.6μ, and the maximum diameter being 4.5μ. Grain diameter was determined by using a transmittance electronmicroscope and calculation of Tg was followed by the method as stated in pages 168~170, "Manual of Paint-use Synthetic Resins" written by Kyozo Kitaoka, published by Kobunshi Kankokai.

MANUFACTURING EXAMPLE 14

Preparation of resinous particles No. 14

Into a similar reaction vessel as used in Manufacturing Example 13, were placed 245 parts of deionized water and 25 parts of seed emulsion of Manufacturing Example 1 and the temperature was raised to 80° C. To this, was added, while stirring, an aqueous solution of 0.1 part of ammonium persulfate and 20 parts of deionized water, and then dropwise a pre-emulsion consisting of 195 parts of methyl methacrylate, 100 part of 2-ethylhexyl acrylate, 200 parts of deionized water, 0.3 part of sodium dodecylbenzene sulfonate and 0.6 part of ammonium persulfate over 2 hours. The calculated Tg of random polymer from these monomers is 8.5° C. After completion of said addition, stirring was continued for 10 minutes (to complete the formation of inner portion) and then a monomer mixture of 65 parts of methyl methacrylate and 135 parts of 2-ethylhexyl acrylate was added in 15 minutes. The calculated Tg of random polymer from the latter monomers is −48° C. The reaction mixture was treated, thereafter, as in Manufacturing Example 13 to obtain an emulsion having a non-volatile content of 48.0%, average grain diameter of the resinous particles being 2.6μ and the maximum diameter being 4.5μ.

MANUFACTURING EXAMPLE 15

Preparation of resinous particles No. 15

Into a similar reaction vessel as used in Manufacturing Example 1, were placed 520 parts of deionized water and the temperature was raised to 80° C. To this, were added, while stirring, an aqueous solution of 15 parts of ammonium persulfate and 100 parts of deionized water and 20 parts of a monomer mixture composed of 384 parts of methyl methacylate, 96 parts of 2-ethylhexyl acrylate and 40 parts of n-dodecylmercaptan, and the mixture was stirred for 5 minutes. Thereafter, the remaining 500 parts of said monomer mixture were dropwise added in 1 hour. The calculated Tg of random polymer from these monomers is 41.5° C. After completion of said addition, stirring was continued for 15 minutes, and a monomer mixture of 48 parts of methyl methacrylate, 58 parts of 2-ethylhexyl acrylate, 2 parts of methacrylic acid and 12 parts of 2-hydroxyethyl acrylate was dropwise added in 20 minutes. The calculated Tg of random polymer from these monomers is −26.5° C. Next, an aqueous solution of 0.2 part of ammonium persulfate and 40 parts of deionized water was added and the mixture was stirred for 1 hour to complete the reaction. Thus obtained emulsion had a non-volatile content of 50.0%, average grain diameter of the resinous particles being 0.40μ and the maximum diameter being 1.2μ.

MANUFACTURING EXAMPLE 16

Preparation of resinous particles No. 16

Into a reaction vessel, were placed 300 parts of deionized water and 25 parts of seed emulsion obtained in Manufacturing Example 1 and two stage emulsion polymerization was carried out as in Manufacturing Example 13. However, in this Example, a mixture of 310 parts of methyl methacrylate, 100 parts of 2-ethylhexyl acrylate, 35 parts of 2-hydroxyethyl acrylate, 22.5 parts of n-dodecyl mercaptan, 180 parts of deionized water, 0.35 part of sodium dodecylbenzene sulfonate and 0.7 part of ammonium persulfate (calculated Tg of random polymer from this monomer composition is 26° C.) was used as pre-emulsion in the first stage and a mixture of 50 parts of methyl methacrylate, 2.5 parts of n-dodecyl mercaptan, 20 parts of deionized water, 0.05 part of sodium dodecylbenzene sulfonate and 0.1 part of ammonium persulfate (calculated Tg of methylmethacrylate polymer is 105° C.) was used as pre-emulsion in the second stage, to obtain an emulsion having a non-volatile content of 50.0%, average grain diameter of the resinous particles being 1.7μ and the maximum diameter being 5.0μ.

MANUFACTURING EXAMPLE 17

Preparation of resinous particles No. 17

The procedures of Manufacturing Example 14 were repeated excepting using as first stage pre-emulsion a mixture of 100 parts of methyl methacrylate, 200 parts of 2-ethylhexyl acrylate, 200 parts of deionized water, 0.4 part of sodium dodecylbenzene sulfonate and 0.9 part of ammonium persulfate (calculated Tg of random polymer from this monomer composition is −47° C.) and as second stage monomer mixture a composition of 150 parts of methyl methacrylate and 45 parts of 2-hydroxyethyl acrylate (calculated Tg of random polymer from these monomers is 68° C.), to obtain an emulsion having a non-volatile content of 50.0%, average grain diameter of the resinous particles being 2.6μ and the maximum diameter being 4.0μ.

MANUFACTURING EXAMPLE 18

Preparation of resinous particles No. 18

The same procedure as stated in Manufacturing Example were repeated excepting using as monomer mixture in the first stage a mixture consisting of 180 parts of methyl methacrylate, 300 parts of 2-ethylhexyl acrylate and 40 parts of n-dodecylmercaptan (calculated Tg of random polymer from this monomer composition is −41° C.) and as monomer mixture in the second stage a mixture consisting of 91 parts of methyl methacrylate, 12 parts of methacrylic acid and 12 parts of 2-hydroxyethyl acrylate (calculated Tg of random polymer from these monomers is 90° C.), to obtain an emulsion having a non-volatile content of 50.0%, average grain diameter of the resinous particles being 0.40μ and the maximum diameter being 1.2μ.

RESINOUS PARTICLES COMPOSED OF INNER AND OUTER PORTIONS EACH HAVING DIFFERENT NUMBER AVERAGE MOLECULAR WEIGHT

MANUFACTURING EXAMPLE 19

Preparation of resinous particles No. 19

Into a similar reaction vessel as used in Manufacturing Example 1, were placed 300 parts of deionized water and 25 parts of seed emulsion as obtained in the Manufacturing Example 1, and then the procedures of Manufacturing Example 9 were repeated. However, in this Example, there was used as the first stage pre-emulsion a mixture of 295 parts of methyl methacrylate, 100 parts of 2-ethylhexyl acrylate, 34 parts of 2-hydroxyethyl acrylate, 24 parts of n-dodecylmercaptan, 180 parts of deionized water, 0.35 part of sodium dodecylbenzene sulfonate and 0.7 part of ammonium persulfate, and as the second stage pre-emulsion a mixture of 45 parts of methyl methacrylate, 15 parts of 2-ethylhexyl acrylate and 5 parts of 2-hydroxyethyl acrylate, to obtain an emulsion having a non-volatile content of 50.0%, average grain diameter of the resinous particles being 1.6μ and the maximum diameter being 4.5μ.

MANUFACTURING EXAMPLE 20

Preparation of resinous particles No. 20

Into a reaction vessel, were placed 265 parts of deionized water and an aqueous solution of 0.1 part of ammonium persulfate and 10 parts of deionized water, and then the same procedures as stated in Manufacturing Example 14 were repeated excepting using as pre-emulsion in the first stage polymerization a mixture of 203 parts of methyl methacrylate, 69 parts of 2-ethylhexyl acrylate, 23 parts of 2-hydroxyethyl acrylate, 16 parts of n-dodecylmercaptan, 200 parts of deionized water, 0.3 part of sodium dodecylbenzene sulfonate and 0.6 part of ammonium persulfate, and as the monomer mixture in the second stage polymerization a mixture of 137 parts of methyl methacrylate, 47 parts of 2-ethylhexyl acrylate and 16 parts of 2-hydroxyethyl acrylate, to obtain an emulsion having a non-volatile content of 50.0%, average grain diameter of resinous particles being 2.6μ and the maximum diameter being 3.8μ.

MANUFACTURING EXAMPLE 21

Preparation of resinous particles No. 21

The same procedures as stated in Manufacturing Example 15 were repeated excepting using as the monomer mixture in the second stage polymerization a mixture of 48 parts of methyl methacrylate, 46 parts of 2-ethylhexyl acrylate, 2 parts of methacrylic acid, 12 parts of 2-hydroxyethyl acrylate and 12 parts of ethyleneglycol dimethacrylate, to obtain an emulsion having a non-volatile content of 50.0%, average grain diameter of resinous particles being 0.40μ and the maximum diameter being 1.2μ.

MANUFACTURING EXAMPLE 22

Preparation of resinous particles No. 22

Into a reaction vessel, were placed 215 parts of deionized water and 25 parts of seed emulsion of Manufacturing Example 1, and the the same procedures as stated in Manufacturing Example 13 were repeated, excepting using as the first stage pre-emulsion a mixture of 295 parts of methyl methacrylate, 100 parts of 2-ethylhexyl acrylate, 34 parts of 2-hydroxyethyl acrylate, 200 parts of deionized water, 0.4 part of sodium dodecyl benzene sulfonate and 0.9 part of ammonium persulfate, and as the second stage pre-emulsion a mixture of 45 parts of methyl methacrylate, 15 parts of 2-ethylhexyl acrylate, 5 parts of 2-hydroxyethyl acrylate, 30 parts of deionized water, 0.06 part of sodium dodecylbenzene sulfonate, 0.14 part of ammonium persulfate and 4 parts of n-dodecyl mercaptan, to obtain en emulsion having a non-volatile content of 50.0%, average grain diameter of resinous particles being 1.6µ and the maximum diameter being 2.5µ.

MANUACTURING EXAMPLE 23

Preparation of resinous particles No. 23

To a mixture of 250 parts of deionized water and 25 parts of the seed emulsion of Manufacturing Example 1, were added an aqueous solution of 0.1 part of ammonium persulfate and 17 parts of deionized water, and then the same procedures as stated in Manufacturing Example 14 were repeated, excepting using as the first stage pre-emulsion a mixture of 195 parts of methyl methacrylate, 100 parts of 2-ethylhexyl acrylate, 200 parts of deionized water, 0.4 part of sodium dodecylbenzene sulfonate and 0.9 part of ammonium persulfate and as the second stage monomer mixture a composition of 135 parts of methyl methacrylate, 65 parts of 2-ethylhexyl acrylate and 6 parts of n-dodecylmercaptan, to obtain an emulsion having a non-volatile content of 50.0%, average grain diameter of resinous particles being 2.8µ and the maximum diameter being 4.0µ.

MANUFACTURING EXAMPLE 24

Preparation of resinous particles No. 24

The same procedures as stated in Manufacturing Example 15 were repeated. However, in the first stage reaction, modification was made so as to add to 485 parts of deionized water an aqueous solution of 15 parts of ammonium persulfate and 100 parts of deionized water, then 20 parts of monomer mixture consisting of 385 parts of methyl methacrylate, 110 parts of 2-ethylhexyl acrylate and 5 parts of ethyleneglycol dimethacrylate, and finally the remaining 480 parts of said monomer mixture, and in the second stage reaction, a monomer mixture of 48 parts of methyl methacrylate, 48 parts of 2-ethylhexyl acrylate, 12 parts of methacrylic acid, 12 parts of 2-hydroxyethyl acrylate and 2 parts of n-dodecylmercaptan was used, to obtain an emulsion having a non-volatile content of 50.0%, average grain diameter of resinous particles being 0.42µ and the maximum diameter being 1.2µ.

RESINOUS PARTICLES COMPOSED OF INNER AND OUTER PORTIONS EACH HAVING DIFFERENT HYDROPHILIC PROPERTIES

MANUFACTURING EXAMPLE 25

Preparation of resinous particles No. 25

Into a reaction vessel, were placed 300 parts of deionized water and 25 parts of seed emulsion obtained in Manufacturing Example 1, and the temperature was raised to 80° C. To this, while maintaining stirring, an aqueous solution of 0.1 part of ammonium persulfate and 20 parts of deionized water was added. Thereafter, the same procedures as stated in Manufacturing Example 13 were repeated, excepting using as the first stage pre-emulsion a mixture of 295 parts of methyl methacrylate, 100 parts of 2-ethylhexyl acrylate, 34 parts of 2-hydroxyethyl acrylate, 24 parts of n-dodecylmercaptan, 200 parts of deionized water, 0.4 part of sodium dodecylbenzene sulfonate and 0.9 part of ammonium persulfate and as the monomer mixture in the second stage a mixture of 41 parts of methyl methacrylate and 25 parts of acrylic acid, to obtain an emulsion having a solid content of 48.5%, average grain diameter of resinous particles being 1.6µ and the maximum diameter being 2.5µ.

MANUFACTURING EXAMPLE 26

Preparation of resinous particles No. 26

Into a reaction vessel, were placed 25 parts of seed emulsion obtained in Manufacturing Example 1 and 300 parts of deionized water and the mixture was raised to 80° C. To this, was added, while maintaining stirring, an aqueous solution of 0.1 part of ammonium persulfate and deionized water. Thereafter, the same procedures as stated in Manufacturing Example 14 were repeated, excepting using as the first stage pre-emulsion a mixture of 295 parts of methyl methacrylate, 100 parts of 2-ethylhexyl acrylate, 34 parts of 2-hydroxyethyl acrylate, 24 parts of n-dodecylmercaptan, 200 parts of deionized water, 0.4 part of sodium dodecylbenzene sulfonate and 0.9 part of ammonium persulfate and as the second stage monomer mixture a composition of 31 parts of methyl methacrylate and 35 parts of 2-hydroxyethyl acrylate, to obtain an emulsion having a non volatile content of 48.0%, average grain diameter of resinous particles being 1.6µ and the max. diameter being 2.5µ.

MANUFACTURING EXAMPLES 27 TO 32

Using the materials shown in Table 3 and following the procedures as stated in Manufacturing Example 26, the resinous particles Nos. 27 to 32 were prepared, respectively.

TABLE 3

| No. | 27 | 28 | 29 | 30 | 31 | 32 |
|---|---|---|---|---|---|---|
| water | 265 | 255 | 260 | 275 | 265 | 265 |
| seed emulsion | 25 | 25 | 75 | 12 | 25 | 25 |
| Pre-emulsion | | | | | | |
| MMA | 295 | 295 | — | 308 | 303 | — |
| 2-EHA | 100 | 100 | — | 140 | 105 | 105 |
| 2 HEA | 34 | 34 | — | 35 | 37 | 37 |
| ST | — | — | 235 | — | — | 303 |
| DM | 5 | — | 25 | 5 | 5 | 5 |
| DBS | 0.4 | 0.4 | 0.8 | 0.4 | 0.4 | 0.4 |
| APS | 0.9 | 0.9 | 0.9 | 0.9 | 0.9 | 0.9 |
| DIW | 200 | 200 | 200 | 250 | 200 | 200 |
| monomer mixture | | | | | | |
| MMA | 26 | 37 | — | — | 20 | — |
| ST | — | — | 255 | — | — | 20 |

TABLE 3-continued

| No. | 27 | 28 | 29 | 30 | 31 | 32 |
|---|---|---|---|---|---|---|
| AA | — | — | 25 | — | — | — |
| MAA | — | 29 | — | 9 | 10 | 10 |
| NMAM | 40 | — | — | — | — | — |
| EGDM | — | — | — | — | 20 | — |
| DVB | — | — | — | — | — | 20 |
| aver. diameter (μ) | 1.7 | 1.5 | 0.9 | 4.8 | 1.3 | 1.3 | wherein:
AA: acrylic acid
NMAM: N-methylol acrylamide
DVB: divinyl benzene

MANUFACTURING EXAMPLE 33

Preparation of resinous particles No. 33

In a similar reaction vessel as used in Manufacturing Example 1, were placed 570 parts of deionized water and the temperature was raised to 80° C. To this, while maintaining stirring, an aqueous solution of 15 parts of ammonium persulfate and 100 parts of deionized water, and 20 parts of the monomer mixture composed of 384 parts of 384 parts of methyl methacrylate, 96 parts of 2-ethylhexyl acrylate and 40 parts of n-dodecylmercaptan were added and the mixture was stirred for 5 minutes. Thereafter, the remaining 500 parts of the monomer mixture were added dropwise in the reaction mixture in 1 hour. After completion of said addition, another monomer mixture of 48 parts of methyl methacrylate, 46 parts of 2-ethylhexyl acrylate, 12 parts of methacrylic acid and 2 parts of ethyleneglycol dimethacrylate was added dropwise in 20 minutes. Thereafter, an aqueous solution of 0.2 part of ammonium persulfate and 40 parts of deionized water was added and the mixture was stirred for 1 hour to complete the reaction. Thus obtained emulsion had a non-volatile content of 48.0%, average grain diameter of resinous particles being 0.4μ and the maximum diameter being 1.3μ.

MANUFACTURING EXAMPLE 34

Preparation of Comparative resinous particles No. 1

In a similar reaction vessel as used in Manufacturing Example 1, were placed 700 parts of deionized water and 10 parts of sodium dodecylbenzene sulfonate and the temperature was raised to 80° C. To this, were added, while maintaining stirring, 4.5 parts of ammonium persulfate and then dropwise, a monomer mixture of 360 parts of methyl methacrylate, 105 parts of 2-ethylhexyl acrylate, 35 parts of 2-hydroxyethyl acrylate and 10 parts of n-dodecylmercaptan in 2 hours. After completion of said addition, to the mixture was added an aqueous solution of 0.5 part of ammonium persulfate and 50 parts of deionized water and stirred for 1 hour to complete the reaction. Thus obtained emulsion had a non-volatile content of 40%, average grain diameter of resinous particles being 0.19μ and number average molecular weight of the resin being 8,200.

MANUFACTURING EXAMPLE 35

Preparation of Comparative resinous particles No. 2

In a similar reaction vessel as used in the abovesaid preparation example, were placed 900 parts of deionized water, 1.5 part of Metholose 60SH-50 (methyl cellulose, manufactured by Shinetsu Kagaku), 216 parts of methyl methacrylate, 63 parts of 2-ethylhexyl acrylate, 21 parts of 2-hydroxyethyl acrylate, 6 parts of n-dodecylmercaptan, and 6 parts of azobisisobutyronitrile, and the mixture was stirred at 250 rpm at 65° C. for 7 hours to complete the reaction. Thus obtained suspension was filtered through 200 mesh sieve to obtain pearl particles having diameters of 20 to 600μ. The particles were ball-milled for 24 hours to obtain the resinous particles having an average grain diameter of 18μ and the maximum diameter of 45μ, the molecular weight being 7,600.

AQUEOUS RESINS

MANUFACTURING EXAMPLE 36

Preparation of aqueous resin No. 1

Into a 2 liter glass reaction vessel fitted with stirrer, thermoregulator and decanter, were placed 420 parts of safflower oil, 254 parts of neopentylglycol, 6 parts of trimethylol ethane, 120 parts of phthalic anhydride, 240 parts of trimellitic anhydride and 25 parts of xylene, and the mixture was stirred and heated. While maintaining the reaction temperature at 190° to 210° C. and removing the formed water by azeotropic distillation from the reaction mixture, polyesterification was continued for 5 hours to obtain an alkyd resin having an acid value of 56, OH value of 40, number average molecular weight of 1600 and oil length of 40. Next, the resin was diluted with 190 parts of ethylene glycol monobutyl ether and 95 parts of isopropanol, neutralized with 89 parts of dimethylethanolamine and mixed with 601 parts of deionized water to obtain an aqueous varnish having a non-volatile content of 50%.

MANUFACTURING EXAMPLE 37

Preparation of aqueous resin No. 2

Into a similar reaction vessel as used in Manufacturing Example 36, were placed 273 parts of tall oil fatty acid, 197 parts of trimethylolpropane, 78 parts of neopentylglycol, 91 parts of hydrogenated bisphenol A, 204 parts of isophthalic acid, 157 parts of trimellitic anhydride and 20 parts of xylene and the mixture was stirred and heated. While maintaining the reaction temperature at 180° to 210° C. and removing the formed water therefrom, the reaction was continued for 5 hours to obtain an alkyd resin having an acid value of 65, OH value of 100, number average molecular weight of 1500 and oil length of 30. Thereafter, to the resin was added 183 parts of ethyleneglycol monobutyl ether and 96 parts of dimethyl ethanolamine and then diluted with 832 parts of deionized water to obtain an aqueous varnish having a non-volatile content of 45%.

MANUFACTURING EXAMPLE 38

Preparation of aqueous resin No. 3

Using the same procedures as stated in Manufacturing Example 37, polyester resin having an acid value of 55, OH value of 100 and number average molecular weight of 1500 was prepared from 69 parts of trimethylol propane, 297 parts of neopentylglycol, 91 parts of hydrogenated bisphenol A, 201 parts of isophthalic acid, 186 parts of tetrahydrophthalic acid, 155 parts of trimellitic anhydride, and 10 parts of xylene. Next, 183 parts of ethyleneglycol monobutyl ether and 82 parts of dimethylethanolamine were added and the mixture was diluted with 851 parts of deionized water to obtain an aqueous varnish of non-volatile content 45%.

MANUFACTURING EXAMPLE 39

Preparation of aqueous resin No. 4

Into a 1 liter reaction vessel fitted with stirrer, thermoregulator and condenser, were placed 117 parts of dehydrated castor oil, 173 parts of soybean oil, 17 parts of glycerol, 61 parts of pentaerythritol, 132 parts of phthalic anhydride and 7.5 parts of xylene, and the mixture was, while maintaining the reaction temperature at 180° to 220° C. and removing the formed water therefrom, reacted for 3 hours to obtain an alkyd resin having oil length of 57%, acid value of 10, number average molecular weight of 1800. This resin was diluted with xylene to obtain an alkyd resin varnish having a non-volatile content of 60%. Into a similar reaction vessel as stated hereinabove, were placed 200 parts of said alkyd resin varnish and 104 parts of ethyleneglycol monobutyl ether and the mixture was stirred and heated to 130° C. A monomeric mixture of 60 parts of styrene, 102 parts of methyl methacrylate, 65 parts of 2-hydroxyethyl methacrylate, 31 parts of acrylic acid, 143 parts of n-butylacrylate, 6 parts of di-t-butylperoxide and 8 parts of lauryl mercaptan was added dropwise in 3 hours and the reaction was further continued for 1 hour. Thus obtained acryl modified alkyd resin had an acid value of 50 and number average molecular weight of 7300. The abovesaid reaction mixture was then subjected to 100% neutralization with dimethylethanolamine and diluted with deionized water to obtain an aqueous varnish having a non-volatile content of 50%.

MANUFACTURING EXAMPLE 40

Preparation of aqueous resin No. 5

Into a similar reaction vessel as used in Manufacturing Example 35, were placed 169 parts of neopentylglycol, 6 parts of trimethylolethane, 46 parts of hydrogenated bisphenol A, 174 parts of isophthalic acid, 65 parts of adipic acid, 40 parts of maleic anhydride and 10 parts of xylene, and the mixture was stirred and heated. The reaction was continued, while maintaining the temperature at 190° to 210° C. and removing the formed water therefrom, for 4 hours to obtain a polyester resin having an acid value of 48 and number average molecular weight of 1200. This resin was diluted with ethyleneglycol monobutyl ether to obtain a polyester resinous varnish having a non-volatile content of 80%. Following the procedure of the latter half of Manufacturing Example 39 but substituting 150 parts of the abovesaid polyester resinous varnish for 200 parts of alkyd resinous varnish and 154 parts of ethyleneglycol monobutyl ether for 104 parts of ethyleneglycol monoethyl ether, an acryl modified polyester resin having an acid value of 50 and number average molecular weight of 6500 was obtained, which was then subjected to 100% neutralization with dimethylethanolamine and diluted with deionized water to obtain an aqueous varnish having a non-volatile content of 50%.

MANUFACTURING EXAMPLE 41

Preparation of aqueous resin No. 6

Into a 1 liter reaction vessel fitted with stirrer, thermoregulator and condenser, were placed 76 parts of ethyleneglycol monobutylether, and to this was dropwise added 61 parts of a monomeric mixture of 45 parts of styrene, 63 parts of methyl methacrylate, 48 parts of 2-hydroxyethyl methacrylate, 117 parts in n-butylacrylate, 27 parts of methacrylic acid, 3 parts of laurylmercaptan, and 3 parts of azobisisobutyronitrile, and the temperature was raised to 120° C. under stirring. The remaining 245 parts of the monomeric mixture was then dropwise added in 3 hours and the mixture was stirred for additional 1 hour. Thereafter, 28 parts of dimethylethanolamine and 200 parts of deionized water were added to obtain an acryl resinous varnish having a non-volatile content of 50%, number average molecular weight of the resin being 6000.

MANUFACTURING EXAMPLE 42

Preparation of pigment pastes

Into a 1.5 liter closed stainless steel vessel, were placed 178 parts of aqueous resin No. 2, 320 parts of Taipake R-820 (rutile type titanium oxide, manufactured by Ishihara Sangyo) and 60 parts of deionized water. To this, were added 500 cc of glass beads and the content was premixed with a stirrer and then mixed well by means of paint conditioner for 2 hours to obtain a pigment paste No. 1.

Repeating the same procedures but substituting aqueous resin Nos. 3, 4, 5 and 6 for No. 2, pigment paste Nos. 2, 3, 4 and 5 were prepared, respectively.

EXAMPLE 1 AND COMPARATIVE EXAMPLE 1

Into a 500 cc stainless beaker, were weighed 210 parts of aqueous resin No. 1 and 84.4 parts of resinous particles No. 8 and the contents were mixed well by using stirrer to obtain a clear paint. This paint was applied by curtain coating on glass plate and baked at 120° C. for 20 minutes. Thus obtained coating was clear and had a flat surface and showed no abnormality even after dipping in tap water for 24 hours. This paint was then diluted with water to Ford cup #4 viscosity of 30 seconds and used in spray coating. The maximum film thickness showing no sagging was 43μ.

For comparison purpose, aqueous resin No. 1 alone was, after adjusting viscosity in a similar way, applied by spray coating means. At this time, the maximum film thickness showing no sagging was less than 15μ.

EXAMPLES 2 TO 10 AND COMPARATIVE EXAMPLES 2 TO 4

Preparation of coating composition

In a stainless steel vessel, the materials shown in Table 4 were mixed well by means of a mixer at room temperature to obtain the respective coating composition.

Table 5 shows the materials used for the preparation of comparative coating compositions.

Application and evaluation of coating

The respective coating composition was diluted with deionized water to Ford cup #4 viscosity of 30 sec. Following the normal procedure, the composition was applied onto steel plates by spraying and after setting for 5 minutes, baked at 150° C. for 15 minutes to obtain crosslinked coating.

The maximum film thickness showing no pinhole, the maximum film thickness showing no sagging and gloss for the respective coating are given in Table 6.

TABLE 4

| | (parts) | | | | | | | | | | | | | |
|---|---|---|---|---|---|---|---|---|---|---|---|---|---|---|
| | pigment paste | | aqueous resin | | | resinous particles | | | | | | | | Al- | |
| Example | 1 | 2 | 1 | 2 | 3 | 1 | 2 | 3 | 4 | 5 | 6 | 7 | 8 | con* | MF |
| 2 | 140 | | | 47 | | 85 | | | | | | | | | 18 |
| 3 | 140 | | | 89 | | | 52 | | | | | | | | 15 |
| 4 | 140 | | 106 | | | | | 17 | | | | | | | 18 |
| 5 | | 140 | | 80 | | | | | 63 | | | | | | 14 |
| 6 | | 140 | | 127 | | | | | | 8 | | | | | 19 |
| 7 | | 140 | | 76 | | | | | | | 48 | | | | 23 |
| 8 | 140 | | | 71 | | | | | | | | 73 | | | 13 |
| 9 | | 140 | | 53 | | | | | | | | | 98 | | 5 |
| 10 | | 140 | | 80 | | | | | 63 | | | | | 2 | 14 |

MF: hexamethoxy methylol melamine (solid 100%);
*Alcon P-125 (alicyclic hydrocarbon resin, manufactured by Arakawa Ringyo K.K.

TABLE 5

| | (parts) | | | | | | | | |
|---|---|---|---|---|---|---|---|---|---|
| Comp. | pigment paste | | Aqueous resin | | | present resin. | comparative | comparative | |
| Example | 1 | 2 | 1 | 2 | 3 | particles No. 1 | res. part. No. 1 | res. part. No. 2 | MF |
| 2 | 140 | | | 18 | | 135 | | | 7 |
| 3 | | 140 | | 76 | | | 54 | | 23 |
| 4 | 140 | | | 89 | | | | 25 | 15 |

TABLE 6

| Exam. | pinhole | sagging | gloss |
|---|---|---|---|
| 2 | | O | |
| 3 | | | O |
| 4 | | | O |
| 5 | O | | |
| 6 | | | |
| 7 | | | O |
| 8 | O | | O |
| 9 | O | | |
| 10 | | | |
| comp. exam. | | | |
| 2 | X | O | X |
| 3 | XX | Δ | O |
| 4 | XX | Δ | X |

| maximum film thick. showing no pinhole | maximum film thick. showing no sagging | gloss 60° gloss value |
|---|---|---|
| more than 55μ | more than 50μ | more than 90 |
| O more than 50μ | O more than 40μ | O more than 85 |
| Δ more than 40μ | Δ 30~40μ | Δ 80~85 |
| X 30~40μ | X less than 30μ | X less than 80 |
| XX less than 30μ | | |

EXAMPLES 11 TO 14

Into a stainless steel vessel, the materials shown in Table 7 were weighed and stirred well by means of stirrer to obtain the coating compositions. According to the procedures of Examples 2 to 10, baked coatings were prepared and evaluated in the same way. The results are shown in Table 8.

TABLE 7

| Ex. | pigment paste | | aqueous resin | | resinous partcls. | | | | |
|---|---|---|---|---|---|---|---|---|---|
| No. | 2 | 4 | 3 | 6 | 9 | 10 | 11 | 12 | MF |
| 11 | 140 | | 89 | | 52 | | | | 15 |
| 12 | | 140 | | 80 | | 50 | | | 14 |
| 13 | 140 | | 89 | | | | 52 | | 15 |
| 14 | | 140 | | 80 | | | | 50 | 14 |

TABLE 8

| Ex. No. | pinhole | sagging | gloss | appearance |
|---|---|---|---|---|
| 11 | | | | |
| 12 | O | | O | |

TABLE 8-continued

| Ex. No. | pinhole | sagging | gloss | appearance |
|---|---|---|---|---|
| 13 | | | | |
| 14 | | | O | |

Evaluation standard of appearance (by visual observation)
 excellent
O good
Δ fairly good
X no good

EXAMPLES 15 TO 18 AND COMPARATIVE EXAMPLES 5 TO 6

Coating compositions were prepared by the prescriptions of Table 9 and evaluated as in Examples 2 to 10. The results are shown in Table 10.

TABLE 9

| Ex. | pigm. paste | | aqueous resin | | resinous particls. | | | | |
|---|---|---|---|---|---|---|---|---|---|
| No. | 3 | 4 | 4 | 5 | 3 | 4 | 6 | 7 | com. 2 | MF |
| 15 | 140 | | 42 | | | 85 | | | | 18 |
| 16 | 140 | | 80 | | | | 52 | | | 15 |
| 17 | | 140 | 85 | | | | | 17 | | 18 |
| 18 | | 140 | 70 | 67 | | | | | | 14 |
| comparative example | | | | | | | | | | |
| 5 | 140 | | 120 | | | | | | | 20 |
| 6 | 140 | | 80 | | | | | | 52 | 15 |

TABLE 10

| Ex. No. | pinhole | sagging | gloss |
|---|---|---|---|
| 15 | | | |
| 16 | O | | |
| 17 | | | |
| 18 | O | | |
| Comp. Ex. | | | |
| 5 | XX | X | |
| 6 | XX | Δ | X |

EXAMPLES 19 TO 25 AND COMPARATIVE EXAMPLES 7 TO 8

Coating compositions were prepared according to the prescriptions shown in Table 11 and evaluated as in Examples 2 to 10. The results are shown in Table 12

EXAMPLES 26 TO 52 AND COMPARATIVE EXAMPLES 9 TO 16

Coating compositions were prepared according to the prescriptions shown in Tables 13~16 and evaluated as in Examples 2 to 10. The results are also shown in Tables 13~16, respectively.

TABLE 12

| Ex. No. | gloss | pinhole | sagging | appearance |
|---|---|---|---|---|
| 19 | | | | |
| 20 | | | | O |
| 21 | O | | | |
| 22 | | | | O |
| 23 | | | | |
| 24 | | | | O |
| 25 | | | | |
| Comp. Ex. | | | | |
| 7 | X | X | Δ | Δ |
| 8 | X | XX | O | Δ |

TABLE 11

| | pigment paste | | | | | aqueous varnish | | | | | res. particle | | | | ben-zoin | MF |
|---|---|---|---|---|---|---|---|---|---|---|---|---|---|---|---|---|
| | 1 | 2 | 3 | 4 | 5 | 2 | 3 | 4 | 5 | 6 | 13 | 14 | 15 | com. 2 | | |
| Ex. No. | | | | | | | | | | | | | | | | |
| 19 | 140 | | | | | 42 | | | | | 82 | | | | | 18 |
| 20 | | 140 | | | | | 120 | | | | | 66 | | | | 20 |
| 21 | | | | 140 | | | | | | | | | 160 | | | 2 |
| 22 | | | 140 | | | | | 100 | | | 35 | | | | | 30 |
| 23 | | | | 140 | | | | | 80 | | 6 | | | | | 15 |
| 24 | 140 | | | | | 60 | | | | 60 | 33 | 33 | | | | 20 |
| 25 | 140 | | | | | 42 | | | | | 82 | | | | 1 | 18 |
| comp. ex. | | | | | | | | | | | | | | | | |
| 7 | 140 | | | | | 120 | | | | | | | | 69* | | 20 |
| 8 | | 70 | | | | | | | | | 180 | | | | | 2 |

*aqueous dispersion having non-volatile content of 48.8%

TABLE 13

| | pigment paste | | | | | aqueous varnish | | | | | resinous particle | | | | MF | film performance | | | |
|---|---|---|---|---|---|---|---|---|---|---|---|---|---|---|---|---|---|---|---|
| | 1 | 2 | 3 | 4 | 5 | 2 | 3 | 4 | 5 | 6 | 16 | 17 | 18 | com. 2 | | glo. | pin. | sag. | app. |
| Ex. No. | | | | | | | | | | | | | | | | | | | |
| 26 | 140 | | | | | 42 | | | | | 82 | | | | 18 | | | | |
| 27 | | 140 | | | | | 120 | | | | | 66 | | | 20 | | | | |
| 28 | | | | 140 | | | | | | | | | 160 | | 2 | O | | | |
| 29 | | | 140 | | | | | 100 | | | 35 | | | | 30 | | | | |
| 30 | | | | 140 | | | | | 80 | | 6 | | | | 15 | | | | |
| 31 | 140 | | | | | 60 | | | | 60 | 33 | 33 | | | 20 | | | | |
| Comp. Ex. | | | | | | | | | | | | | | | | | | | |
| 9 | 140 | | | | | 120 | | | | | | | | 69* | 20 | X | X | Δ | Δ |
| 10 | | 70 | | | | | | | | | 180 | | | | 2 | X | XX | O | Δ |

*aqueous dispersion having a non-volatile content of 48.8%

TABLE 14

| | pigment paste | | | | | aqueous varnish | | | | | resinous particle | | | | MF | film performance | | | |
|---|---|---|---|---|---|---|---|---|---|---|---|---|---|---|---|---|---|---|---|
| | 1 | 2 | 3 | 4 | 5 | 2 | 3 | 4 | 5 | 6 | 19 | 20 | 21 | com. 2 | | glo. | pin. | sag. | app. |
| Ex. No. | | | | | | | | | | | | | | | | | | | |
| 32 | 140 | | | | | 42 | | | | | 82 | | | | 18 | | | | |
| 33 | | 140 | | | | | 120 | | | | | 66 | | | 20 | | | | |
| 34 | | | | 140 | | | | | | | | | 160 | | 2 | O | | | |
| 35 | | | 140 | | | | | 100 | | | 35 | | | | 30 | | | | |
| 36 | | | | 140 | | | | | 80 | | 6 | | | | 15 | | | | |
| 37 | 140 | | | | | 60 | | | | 60 | 33 | 33 | | | 20 | | | | |
| Comp. Ex. | | | | | | | | | | | | | | | | | | | |
| 11 | 140 | | | | | 120 | | | | | | | | 69* | 20 | X | X | Δ | Δ |
| 12 | | 70 | | | | | | | | | 180 | | | | 2 | X | XX | O | Δ |

*aqueous dispersion having a non-volatile content of 48.8%

TABLE 15

| | pigment paste | | | | | aqueous varnish | | | | | resinous particle | | | | MF | film performance | | | |
|---|---|---|---|---|---|---|---|---|---|---|---|---|---|---|---|---|---|---|---|
| | 1 | 2 | 3 | 4 | 5 | 2 | 3 | 4 | 5 | 6 | 22 | 23 | 24 | com. 2 | | glo. | pin. | sag. | app. |
| Ex. No. | | | | | | | | | | | | | | | | | | | |
| 38 | 140 | | | | | 42 | | | | | 82 | | | | 18 | | | | O |
| 39 | | 140 | | | | | 120 | | | | | 66 | | | 20 | | | | |

TABLE 15-continued

| | pigment paste | | | | | aqueous varnish | | | | | resinous particle | | | | MF | film performance | | | |
|---|---|---|---|---|---|---|---|---|---|---|---|---|---|---|---|---|---|---|---|
| | 1 | 2 | 3 | 4 | 5 | 2 | 3 | 4 | 5 | 6 | 22 | 23 | 24 | com. 2 | | glo. | pin. | sag. | app. |
| 40 | | | | | 140 | | | 140 | | | | | | 160 | 2 | O | | | O |
| 41 | | 140 | | | | | 100 | | | | 35 | | | | 30 | | | | |
| 42 | | | 140 | | | | | | 80 | | 6 | | | | 15 | | | | |
| 43 | 140 | | | | | 60 | | | | 60 | 33 | 33 | | | 20 | | | | O |
| Comp. Ex. | | | | | | | | | | | | | | | | | | | |
| 13 | 140 | | | | | 120 | | | | | | | | 69* | 20 | X | X | Δ | Δ |
| 14 | | 70 | | | | | | | | | | | 180 | | 2 | X | XX | O | Δ |

*aqueous dispersion having a non-volatile content of 48.8%

TABLE 16

| | pigment paste | | | | | aqueous varnish | | | | | resinous particle | | | | | | | | |
|---|---|---|---|---|---|---|---|---|---|---|---|---|---|---|---|---|---|---|---|
| | 1 | 2 | 3 | 4 | 5 | 2 | 3 | 4 | 5 | 6 | 25 | 26 | 27 | 28 | 29 | 30 | 31 | 32 | 33 |
| Ex. No. | | | | | | | | | | | | | | | | | | | |
| 44 | | | | | | 70 | | | | | 30 | | | | | | | | |
| 45 | 140 | | | | | 42 | | | | | | 85 | | | | | | | |
| 46 | | 140 | | | | | 120 | | | | | | 69 | | | | | | |
| 47 | | | | 140 | | | | | | | | | | 160 | | | | | |
| 48 | | | 140 | | | | | 40 | | | | | | | 83 | | | | |
| 49 | | | | 140 | | | | | 80 | | | | | | | 6 | | | |
| 50 | 140 | | | | | 80 | | | | | | | | | | | 53 | | |
| 51 | | | | | 140 | | | | | 100 | | | | | | | | 20 | |
| 52 | | | 140 | | | | 40 | 40 | | | | | | | | | | | 50 |
| Comp. Ex. | | | | | | | | | | | | | | | | | | | |
| 15 | 140 | | | | | 120 | | | | | | | | | | | | | |
| 16 | | 70 | | | | | | | | | | | 180 | | | | | | |

| | comp. resin partcls. 2* | MF | film performance | | | |
|---|---|---|---|---|---|---|
| | | | gloss | pinhole | sagging | appearance |
| Ex. No. | | | | | | |
| 44 | | — | | | | |
| 45 | | 18 | | | | |
| 46 | | 20 | | | | |
| 47 | | 2 | O | | | |
| 48 | | 10 | | | | |
| 49 | | 15 | | | | |
| 50 | | 15 | | | | |
| 51 | | 30 | | | | |
| 52 | | 15 | | | | |
| Comp. Ex. | | | | | | |
| 15 | 69* | 20 | X | X | Δ | Δ |
| 16 | | 2 | X | XX | O | Δ |

*aqueous dispersion having a non-volatile content of 48.8%

What is claimed is:

1. An aqueous coating composition comprising:
   (A) at least one aqueous resin selected from the group consisting of alkyd resin, polyester resin, acryl resin, acryl-modified alkyl resin and acryl-modified polyester resin and
   (B) at least one component selected from water-insoluble resinous particles obtained by the polymerization of at least one ethylenically unsaturated compound, the average grain diameter of said particles being 0.3 to 6μ, the solid weight ratio of said (A) to (B) being 99:1 to 15:85.

2. A composition according to claim 1 wherein the average grain diameter of the water-insoluble resinous particles is 0.4 to 5μ.

3. A composition according to claim 1 wherein the polymerization of the ethylenically unsaturated compound is effected by emulsion polymerization.

4. A composition according to claim 1 wherein the solid weight ratio of aqueous resin to water-insoluble resinous particles is 99:1 to 40:60.

5. A composition according to claim 1, further comprising, a surface regulator having a melting point of 80°~180° C.

6. A composition according to claim 1 wherein the number average molecular weight of said water-insoluble resinous particles is within a range of 2,500~50,000.

7. A composition according to claim 1 wherein the solubility parameter of said water-insoluble resinous particles is less than 10.8.

8. A composition according to claim 1 wherein the water-insoluble resinous particles are composed of inner and outer portions of polymers each having different properties.

9. A composition according to claim 8 wherein the resinous particles are composed of an inner portion of polymer with relatively low hydrophilic property and an outer portion of polymer with relatively high hydrophilic property.

10. A composition according to claim 9 wherein the outer portion of polymer is formed by the polymerization of monomers, 0.5 to 100% by weight of said monomers being hydrophilic group bearing monomers.

11. A composition according to claim 9 wherein the inner portion of polymer is formed by the polymerization of monomers, 0 to 50% by weight of said monomers being hydrophilic group bearing monomers.

12. A composition according to claim 11 wherein the hydrophilic group bearing monomer is carboxyl, hydroxyl and/or amide bonding bearing, ethylenically unsaturated compound.

13. A composition according to claim 10 wherein the hydrophilic group bearing monomer is carboxyl, hydroxyl and/or amide bearing, ethylenically unsaturated compound.

14. A composition according to claim 9 wherein the weight ratio of polymers constituting the inner and the outer portions of water-insoluble resinous particles is 7:3∼40:60.

15. A composition according to claim 9 wherein the outer portion polymer is crosslinked.

16. A composition according to claim 8 wherein the water-insoluble resinous particles are obtained by two stage emulsion polymerization from α,β-ethylenically unsaturated monomers using a chain transfer agent in an amount corresponding to 0.3 to 7% by weight, expressed in terms of dodecyl mercaptan, of the total monomers in the first stage polymerization and 0 or less than 0.3 to 7% by weight in the second stage polymerization.

17. A composition according to claim 16 wherein the α,β-ethylenically unsaturated monomers in the second stage polymerization include a croslinking monomer with bi- or more functionality.

18. A composition according to claim 16 wherein the chain transfer agent is alkyl mercaptan or carbon halide.

19. A composition according to claim 16 wherein the chain transfer agent is used in the second stage polymerization in an amount corresponding to 0.3 to 5% by weight, expressed in terms of dodecylmercaptan, of the total monomers.

20. A composition according to claim 8 wherein the water-insoluble resinous particles are obtained by two stage emulsion polymerization from α,β-ethylenically unsaturated monomers using a chain transfer agent in an amount corresponding to 0.3 to 7% by weight, expressed in terms of dodecylmercaptan, of the total monomer in the second stage polymerization and 0 or less than 0.3 to 7% by weight in the first stage polymerization.

21. A composition according to claim 20 wherein the α,β-ethylenically unsaturated monomers used in the first stage emulsion polymerization include a crosslinking monomer with bi- or more functionality.

22. A composition according to claim 20 wherein the chain transfer agent is alkyl mercaptan or carbon halide.

23. A composition according to claim 20 wherein the chain transfer agent in the first stage polymerization is used in an amount corresponding to 0.3 to 5% by weight, expressed in terms of dodecyl mercaptan, of the total monomers.

24. A composition according to claim 8 wherein the water-insoluble resinous particles are composed of hard outer portion polymer of α,β-ethylenically unsaturated compounds having relatively high glass transition temperature and soft inner portion polymer having relatively low glass transition temperature.

25. A composition according to claim 24 wherein the weight ratio of polymers constituting the inner and the outer portions is 7:3∼40:60.

26. A composition according to claim 24 wherein the number average molecular weight of the inner portion polymer is 2,500 to 50,000.

27. A composition according to claim 8 wherein the water-insoluble resinous particles are composed of hard inner portion polymer of α,β-ethylenically unsaturated compounds having relatively high glass transition temperature and soft outer portion polymer having relatively low glass transition temperature.

28. A composition according to claim 27 wherein the weight ratio of polymers constituting the inner and the outer portions is 97:3∼40:60.

29. A composition according to claim 27 wherein the number average molecular weight of the polymer constituting the outer portion is 2,500 to 50,000.

30. A composition according to claim 1 wherein the solubility parameter of said water-insoluble resinous particles is less than 10.4.

* * * * *